United States Patent [19]

Yamane et al.

[11] Patent Number: 4,601,574
[45] Date of Patent: Jul. 22, 1986

[54] DISTANCE MEASURING APPARATUS

[75] Inventors: Satoshi Yamane, Kobe; Toshitatsu Suzuki, Takarazuka, both of Japan

[73] Assignee: Ricoh Company, Ltd., Tokyo, Japan

[21] Appl. No.: 717,604

[22] Filed: Apr. 1, 1985

Related U.S. Application Data

[63] Continuation of Ser. No. 372,817, Apr. 28, 1982, abandoned.

[30] Foreign Application Priority Data

May 1, 1981 [JP] Japan .................................. 56-66743
May 9, 1981 [JP] Japan .................................. 56-69995

[51] Int. Cl.[4] .......................... G01C 3/00; G01C 5/00; G03B 3/00
[52] U.S. Cl. ........................ 356/1; 354/403; 250/214 B
[58] Field of Search ................ 356/1, 141; 354/403; 250/214 B

[56] References Cited

U.S. PATENT DOCUMENTS

| 3,443,502 | 8/1972 | Harvey | 356/141 |
| 3,936,187 | 2/1976 | Momose | 356/1 |
| 3,951,550 | 4/1976 | Slick | 356/141 |
| 4,040,738 | 8/1977 | Wagner | 356/1 |
| 4,274,735 | 6/1981 | Tamura et al. | 356/1 |
| 4,345,827 | 8/1982 | Stemme et al. | 354/25 A |
| 4,391,513 | 7/1983 | Fujiki | 354/25 |
| 4,445,029 | 4/1984 | Nagaoka et al. | 356/1 |

Primary Examiner—S. C. Buczinski
Attorney, Agent, or Firm—Oblon, Fisher, Spivak, McClelland & Maier

[57] ABSTRACT

A distance measuring apparatus for automatically measuring a distance from a reference point to a subject of interest, such as a subject to be photographed, is provided. The present apparatus includes a position sensitive detector having a photoelectric surface defined between two extreme points. Thus, when a light pulse emitted from the apparatus is reflected by the subject and impinges upon the photoelectric surrface, there is produced a pair of current signals, which are then processed to obtain a distance signal indicating the distance to be measured. Thus, the present apparatus can provide a highly accurate measurement.

9 Claims, 20 Drawing Figures

DISTANCE MEASURING APPARATUS

This application is a continuation of application Ser. No. 372,817 filed Apr. 28, 1982, now abandoned.

BACKGROUND OF THE INVENTION

1. Field of the Invention

This invention relates to a distance measuring apparatus for measuring a distance from its position to a subject of interest and in particular to such a distance measuring apparatus as a range finder for use in a camera and the like.

2. Background of the Invention

As a distance measuring apparatus in an autofocus system of a compact-sized camera and the like, use has been mainly made of a passive type dual image coincidence system utilizing external light. However, in such a passive type dual image coincidence system, in which the distance from its position to a subject of interest is determined when the coincidence in position of two images is obtained, it is required to use a movable mirror for varying the position of one image with respect to the other image. The use of such a movable mirror has been a cause of poor durability of prior art distance measuring apparatus. The dual image coincidence system is strongly dependent upon the condition of a subject of interest since it carries out the measurement of distance on the basis of the contrast information of a subject of interest such as a subject to be photographed. Thus, prior art apparatus have been disadvantageous in low capability of measuring distance for the case in which a subject of interest has a low contrast or for the case in which a subject of interest is in a dark place. Moreover, such a prior art system having a movable part has tended to be complicated in structure, requiring time-consuming adjustments.

Use has also been made of an active type triangulation distance measuring system, according to which, since the light to be used for measurement is emitted from the apparatus itself, the problem of dependency on the conditions of a subject of interest is obviated. However, even in such an active system, if there is provided a movable part such as a pivotal light-emitting or light-receiving section, the above-described disadvantages of poor durability and complicated adjustments cannot be solved.

Figure 1:
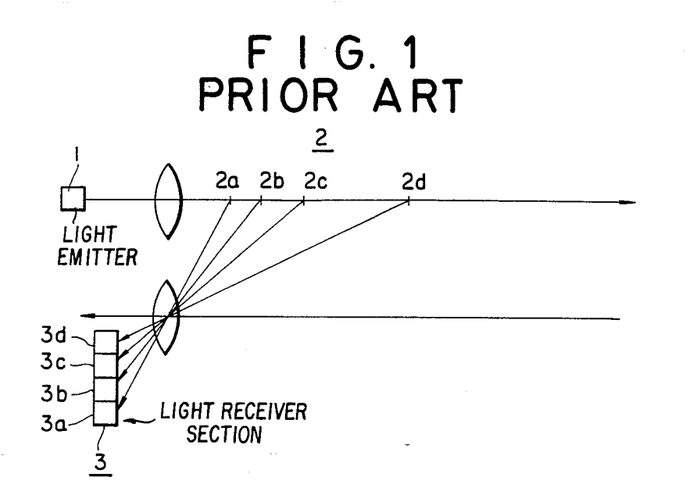
FIG. 1 is a schematic illustration showing the principle of the prior art active type distance measuring apparatus.

In view of the above, there has been proposed an improved active type triangulation distance measuring system having no movable parts, as shown in FIG. 1. As shown, there is provided a light-emitting section 1 which emits light such as infrared light, which is then reflected by a subject of interest 2, e.g., 2a, 2b, 2c and 2d. The reflected light then impinges upon a light-receiving section 3 including a plurality of photocells, four cells 3a, 3b, 3c and 3d in the embodiment shown. Then, the distance to the subject 2 may be obtained by determining which of the light-receiving elements has received the reflected light.

In the distance measuring system shown in FIG. 1, the disadvantages of poor durability and complicated adjustments are obviated. However, it suffers from a disadvantage of limited resolution in distance measurement because of the quantized structure of the light-receiving section 3. For example, in the case where the light receiving section 3 is comprised of four light-receiving elements 3a–3d, as shown in FIG. 1, even if the boundary between two adjacent elements is included, the maximum number of levels results in seven and this number may be further reduced when error is taken into account.

Another form of the active type distance measuring system has been the one using ultrasonic waves. In accordance with this ultrasonic system, an ultrasonic wave is radiated toward a subject of interest and the reflected wave from the subject is received by the system, thereby the distance between the system and the subject is determined by the time expended for going and returning trip. In this system, measurement is carried out by a pure electrical processing, which is rather simple; however, a relatively large power supply is required to obtain a high power ultrasonic radiation. Thus, a power supply incorporated in a compact-sized camera would be insufficient in generating an effective ultrasonic radiation. Moreover, in order to prevent the lowering of accuracy in distance measurement from occurring due to reflection from other subjects than the one of interest, directionality of the radiation must be enhanced, which, in turn, requires a larger area for radiating or receiving a ultrasonic wave. This also presents a problem for application to compact-sized cameras.

SUMMARY OF THE INVENTION

The disadvantages of the prior art are overcome with the present invention and an improved apparatus for measuring a distance to a target subject is provided.

In accordance with one aspect of the present invention, there is provided a distance measuring apparatus for measuring a distance from a reference point to a subject of interest comprising: means for radiating an energy beam toward the subject of interest; receiving means for receiving the energy beam reflected from the subject, said receiving means including a receiving surface defined between two extreme points and supplying a pair of current signals when the reflected evergy beam impinges upon said receiving surface whereby the ratio of said pair of current signals continuously vary depending upon the location of impingement of the reflected energy beam with respect to the two extreme points; and processing means connected to receive the pair of current signals from the receiving means, said processing means processing the pair of current signals to obtain a distance signal indicating the distance between the reference point and the subject of interest.

In accordance with another aspect of the present invention, there is provided a distance measuring apparatus for measuring a distance from a reference point to a subject of interest comprising: means for radiating an energy beam toward the subject of interest; receiving means for receiving the energy beam reflected from the subject, said receiving means including a receiving surface defined between two extreme points and supplying first and second current signals the magnitude of each of which is determined by the location of impingement of said reflected energy beam within and with respect to the two extreme points; first extracting means to which the first current signal is supplied to extract a first fluctuating component from said first current signal thereby eliminating the effect of background light; second extracting means to which the second current signal is supplied to extract a second fluctuating component from the second current signal thereby eliminating the effect of background light; and a differential processing means to which the first and second fluctuating components are supplied to obtain a distance signal by taking a difference between the first and second fluctuating components.

It is therefore an object of the present invention to provide an improved distance measuring apparatus capable of supplying a continuously variable distance signal.

Another object of the present invention is to provide a distance measuring apparatus which may be easily incorporated into a camera as a rangefinder.

A further object of the present invention is to provide an active-type distance measuring apparatus which is not influenced by the surrounding condition.

A still further object of the present invention is to provide a distance measuring apparatus having a broad range of distance measurement.

A still further object of the present invention is to provide a distance measuring apparatus which is stable in operation and thus accurate in measurement.

Other objects, advantages and novel features of the present invention will become apparent from the following detailed description of the invention when considered in conjunction with the accompanyind drawings.

DESCRIPTION OF THE PREFERRED EMBODIMENTS

Figure 2A:
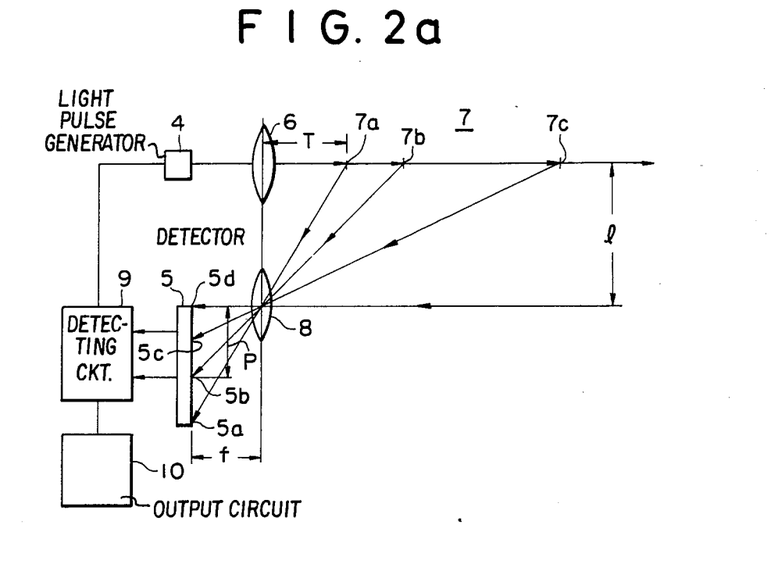
FIG. 2a is a schematic illustration showing one embodiment of the present invention.

Referring now to FIG. 2a, the present distance measuring apparatus comprises a light pulse generator 4, which is preferably structured to radiate a pulse of infrared light because of its invisibility to human eyes as well as sensitivity to a position sensitive detector 5 which will be described in detail later. Light pulse radiated from the light pulse generator 4 is projected to a subject of interest 7 such as 7a, 7b and 7c, the distance to which is to be measured, through a projection lens 6. The reflected light pulse from the subject 7 passes through a light receiving lens 8 and impinges upon the detector 5, forming thereon an image. The detector 5 is a planar-type PIN photodiode manufactured by the use of ion implantation technology and it has a one-dimensional, continuous resolution in position. There is also such a detector of two-dimensional type, which may be used in the present invention as well.

Figure 3A:
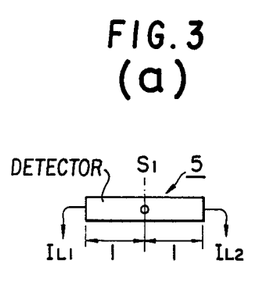
FIGS. 3(a) through (c) are schematic illustrations showing several cases where the beam spot is located at different positions on the position detector 5 used in the apparatus shown in FIG. 2a or 2b.
Figure 3B:
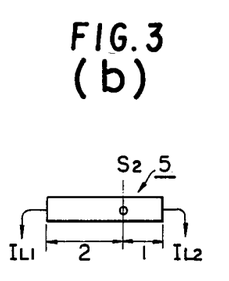
Figure 3C:
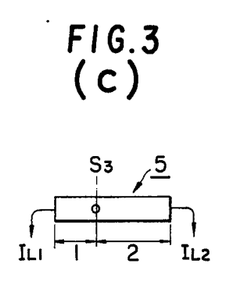

As shown, a light spot is formed at position 5a when the light is reflected by the subject 7 at position 7a, similarly at position 5b for the subject 7 at position 7b, ..., and at 5d for the subject 7 at infinity. The detector 5 supplies a pair of current outputs each having the current level determined by the position of the light spot formed on the detector 5. For instance, when the light spot is formed at the central position S1 of the light receiving surface of the detector 5, the ratio of a pair of current outputs $I_{L1}$ and $I_{L2}$ is such that $I_{L1}/I_{L2}=1$. In the case where the light spot is located at position S2 as shown in FIG. 3(b), the current ratio will be $I_{L1}/I_{L2}=\frac{1}{2}$, and in the case where the light spot is located at position S3 as shown in FIG. 3(c), the current ratio will be $I_{L1}/I_{L2}=2$.

In FIG. 2a, denoting the base length, i.e., distance between the projecting lens 6 and the light-receiving lens 8, with 1; the distance between the lens 8 and the detector 5 with f; the distance between the lens 6 and the subject 7 with T; and the distance between the position 5d corresponding to the subject at infinity and the position where the light spot from the subject 7 is formed with P, then the following relation holds.

$$T = \frac{f \cdot l}{P} \tag{1}$$

As explained above, since the position of the light spot formed on the detector 5 has a particular relationship with the ratio of a pair of current outputs supplied from the detector 5, the distance T from the projection lens 6 to the subject 7 can be determined from such a pair of current outputs.

Now, the relationship between the distance T to the subject 7 and the current ratio $I_{L1}/I_{L2}$ of the detector 5 may be obtained in the following manner with taking the total length of the detector 5 as a unit length, or the length equal to 1.

$$T \cdot \frac{I_{L1}}{I_{L1} + I_{L2}} = f \cdot l \tag{2}$$

Thus, $$T = \frac{I_{L1} + I_{L2}}{I_{L1}} f \cdot l \tag{3}$$

$$= \left(1 + \frac{1}{\frac{I_{L1}}{I_{L2}}}\right) f \cdot l$$

$$= \left(1 + \frac{1}{x}\right) f \cdot l$$

where $x = I_{L1}/I_{L2}$.

Figure 4:
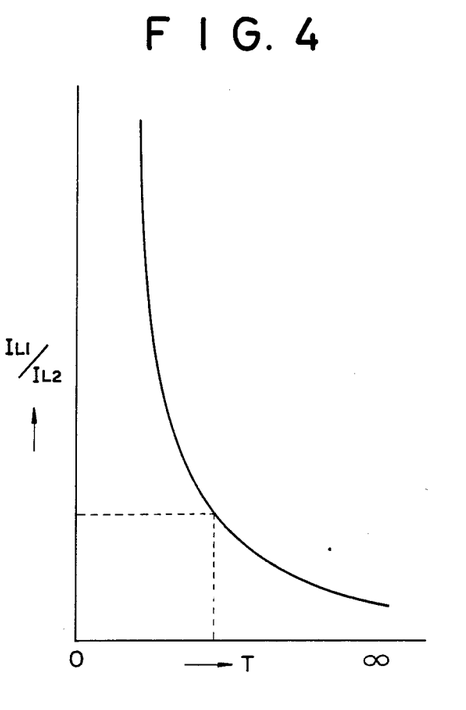
FIG. 4 is a graph showing the characteristics of the position detector 5 with the abscissa indicating the distance to a target subject and the ordinate indicating the current ratio obtained from the position detector.

The relation between the current ratio $I_{L1}/I_{L2}$ and the distance T is graphically shown in FIG. 4.

Figure 2B:
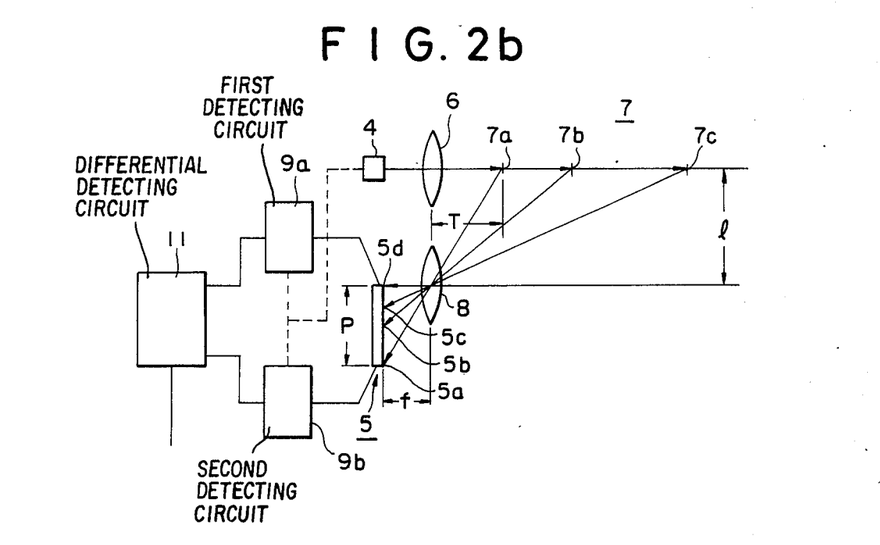
FIG. 2b is a schematic illustration showing another embodiment of the present invention.

No particular problem arises if such a distance measurement is to be carried out in complete darkness. However, in an ordinary situation such as the case of picture-taking, there is usually present background light which is much higher in light amount than the light pulse radiated from the light pulse generator 4, thereby making it impossible to discriminate a reflected light pulse. Under the circumstances, in accordance with one embodiment of the present invention, as shown in FIG. 2a, a detecting circuit 9 is provided to detect a signal current produced only by a reflected light pulse with eliminating the influence of background light, and such a signal current is supplied to an output circuit 10. On the other hand, in accordance with another embodiment of the present invention, as shown in FIG. 2b, there is provided a pair of detecting circuits: first detecting circuit 9a for receiving one current output from the detector 5 and second detecting circuit 9b for receiving the other current output from the detector 5. Thus, the influence of background light is eliminated, and fluctuating components of the signal currents produced only by reflected light pulses are extracted after logarithmic conversion to be supplied to a differential detecting circuit 11 in which a difference between the two fluctuating components is taken and supplied as its output, indicating a distance detecting signal corresponding to the ratio of the two current outputs from the detector 5.

Figure 5:
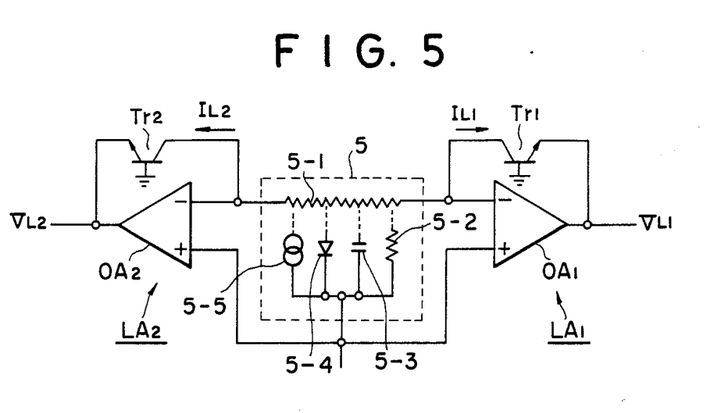
FIG. 5 is a circuit diagram showing a pair of logarithmic converting circuits LA1 and LA2 which are associated with the position detector 5.

FIG. 5 shows the structure in circuit diagram of a detecting head section including the position sensitive detector 5 and the first and second detecting circuits 9a and 9b. In FIG. 5, the detector 5 is shown as an equivalent circuit which includes a surface resistor 5 - 1, a parallel resistor 5 - 2, a junction capacitor 5 - 3, an ideal diode 5 - 4, and a current source 5 - 5. A pair of signal currents $I_{L1}$ and $I_{L2}$ produced by impingement of a light spot on the detector 5 is supplied to a logarithmic conversion section LA1 comprised of a logarithmic conversion transistor Tr1 and an operational amplifier OA1 and a logarithmic conversion section LA2 comprised of a logarithmic conversion transistor Tr2 and an operational amplifier OA2, respectively. As a result of logarithmic conversion, the following pair of outputs $V_{L1}$ and $V_{L2}$ are obtained.

$$V_{L1} = \frac{kT}{q} \cdot \ln \frac{I_{L1}}{I_S} \quad (4)$$

$$V_{L2} = -\frac{kT}{q} \cdot \ln \frac{I_{L2}}{I_S} \quad (5)$$

where, k: Boltzmann constant, T: absolute temperature, q: electron charge, and $I_S$ emitter saturation current of transistor Tr1, Tr2. The logarithmic conversion is carried out because it allows to secure a broader dynamic range and the ratio of two outputs may be calculated simply by taking thier difference.

Figure 6:
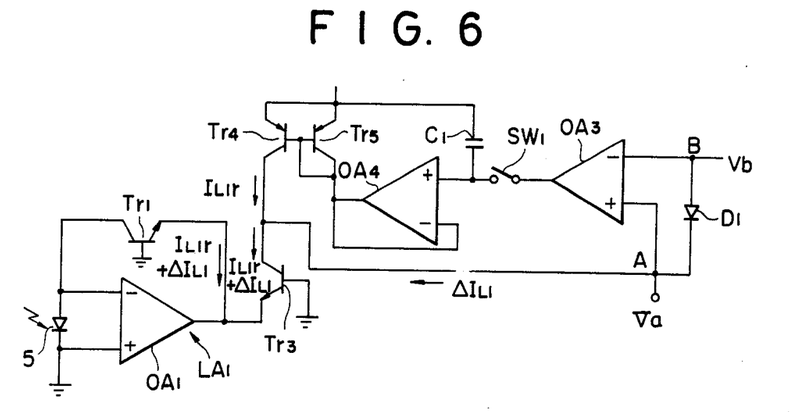
FIG. 6 is a circuit diagram showing a fluctuating current producing circuit which is connected to the logarithmic converting circuit LA1.

FIG. 6 shows the structure of the detecting circuit including a circuit for eliminating the influence of background light from the logarithmic-converted outputs $V_{L1}$ and $V_{L2}$ in accordance with one embodiment of the present invention. The detecting circuit of FIG. 6 should be provided not only for the first signal current $I_{L1}$ but also for the second signal current $I_{L2}$; however, here is only shown the first detecting circuit 9a for the signal current $I_{L1}$. It is to be noted that the second signal circuit 9b of the identical structure must be provided for the second signal current $I_{L2}$ in practical use. In the circuit shown in FIG. 6, in a steady state condition, the background light current $I_{L1r}$ flows through a transistor Tr1, and the same current passes through a transistor Tr3 through a transistor Tr4. At this time, a switch SW1 is closed and thus the output of an operational amplifier OA3 is fed back through an operational amplifier OA4, forming a voltage follower, and transistors Tr5 and Tr4, so that the potential at point A is fixed to the potential at point B to which voltage Vb is applied.

Then, simultaneously with the generation of a light pulse by the light pulse generator 4, the switch SW1 is switched open. At this time, the base potential of the transistor Tr4 is maintained at the level equal to the level of the above-mentioned steady state by means of a capacitor C1, and, therefore, the background light current $I_{L1r}$ still remains to be supplied to the transistor Tr3 through the transistor Tr4. Under the condition, a fluctuating component $\Delta I_{L1}$ of the signal current $I_{L1}$ produced by the reflected light pulse is supplied to the transistor Tr3 from point B via a diode D1. Thus, potential Va1 at point A equals $$Va1 = Vb - \frac{kT}{q} \ln \frac{\Delta I_{L1}}{I_S} \quad (6)$$

where, $I_S$ in equation (6) signifies a reverse current in diode D1. In this manner, a fluctuating component $\Delta I_{L1}$ of the signal current $I_{L1}$ may be extracted. Similarly, potential Va2 corresponding to a fluctuating component $\Delta I_{L2}$ of the signal current $I_{L2}$ may be obtained from the second detecting circuit 9b associated with the second signal current $I_{L2}$ from the detector 5. As a result, a difference between these two potentials may be obtained by the differential detecting circuit 11 as $$Va1 - Va2 = \frac{kT}{q} \ln \frac{\Delta I_{L1}}{I_S} - \frac{kT}{q} \ln \frac{\Delta I_{L2}}{I_S} \quad (7)$$

$$= \frac{kT}{q} \ln \frac{\Delta I_{L1}}{\Delta I_{L2}}$$

Figure 7:
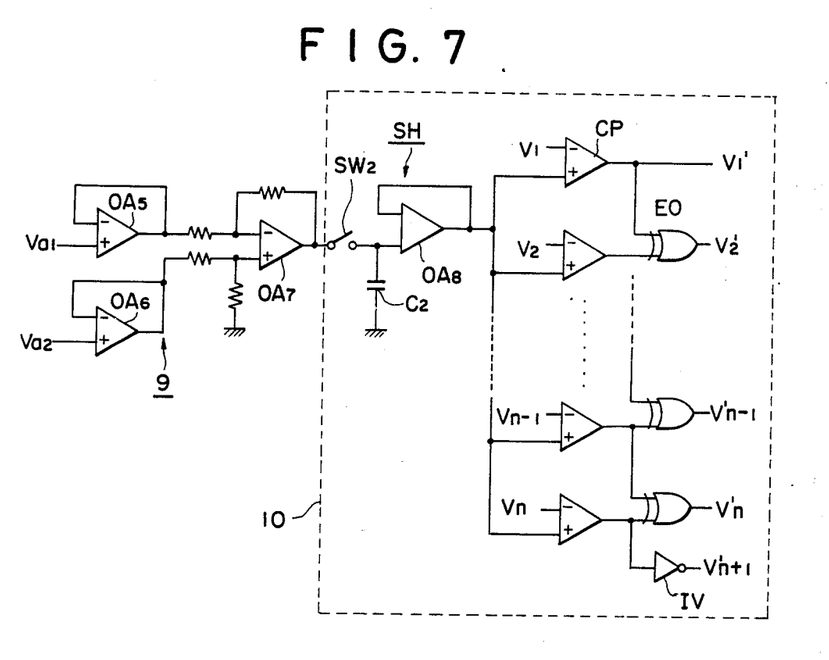
FIG. 7 is a circuit diagram showing one example of further processing the output obtained from the circuit of FIG. 6.

FIG. 7 shows the structure in circuit diagram of the detecting circuit 9 which comprises a pair of operational amplifiers OA5 and OA6 each as a voltage follower and another operational amplifier OA7 as a differential amplifier. The output potentials Va1 and Va2 are supplied to the respective inputs of the amplifier OA7 through the respective amplifiers OA5 and OA6, and the amplifier OA7 supplies as its output a voltage corresponding to the ratio of fluctuating components of the signal currents as indicated in the above equation (7).

The output voltage thus obtained is supplied to the output circuit 10 and the sample and hold circuit SH, forming a part of the circuit 10, samples and holds the output voltage thus supplied. The sample and hold circuit SH includes a switch SW2, a capacitor C2 and an operational amplifier OA8 as a voltage follower. The output circuit 10 also includes a plurality of comparators CP, each having its inverting input connected to an individual voltage V1−Vn (V1>V2> ... >Vn) corresponding to different distances, respectively. The output from the sample and hold circuit SH is commonly supplied to the non-inverting inputs of the comparators CP. The number of the comparators CP corresponds to the number of incremental steps of a distance to be outputted. The output of each of the comparators CP having its inverting input connected from the voltages V2−Vn is connected to one input of a corresponding exclusive—OR circuit EO and also, excepting the downmost comparator EO, to one input of the adjacent, in the downward direction in FIG. 7, exclusive—OR circuit EO, thereby these exclusive—OR circuits EO supply output voltages $V_2'$-$V_n'$, respectively. The comparator CP, which compares the output voltage from the sample and hold circuit SH with the reference voltage V1, supplies an output voltage $V_1'$. Moreover, the comparator CP, which compares the output voltage from the sample and hold circuit SH with the reference voltage Vn, supplies an output voltage $V_{n+1}'$ through an inverter IV. As is obvious, the output voltage $V_1'$ indicates that the voltage from the sample and hold circuit SH is higher than the reference voltage V1; whereas, the output voltage $V_{n+1}'$ indicates that the voltage from the sample and hold circuit SH is lower than the reference voltage Vn. In other words, the voltage $V_1'$ corresponds to a subject of interest at infinity and the voltage $V_{n+1}'$ corresponds to a subject of interest at the closest distance. Thus, one of the output voltages $V_1'$ through $V_{n+1}'$ is always at a high level, and the voltage at a high level constitutes an output signal indicating the distance to the subject 7 which reflected the light pulse. Such an output signal may be used to form a visual indication of the distance or to drive a mechanism for moving the objective of a camera.

Figure 8:
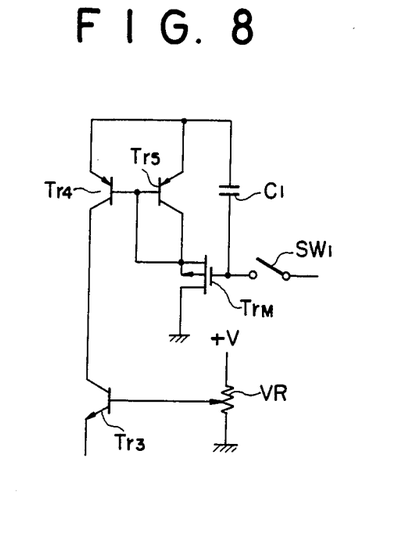
FIG. 8 is a circuit diagram showing another embodiment of the present invention in which the MOSFET TrM is used.

FIG. 8 shows a modification of the present invention in which use is made of a high input impedance element, e.g., MOSFET TrM in FIG. 8, instead of the voltage follower comprised of the operational amplifier OA4 in FIG. 6. If it is desired to increase $\Delta I_L$, the transistor Tr3 in FIG. 6 may be so structured to have a larger emitter area, alternatively, as shown in FIG. 8, the base potential of the transistor Tr3 may be made higher than that of the transistor Tr1 by using a combination of a variable resistor VR and a positive power source +V.

Figure 9:
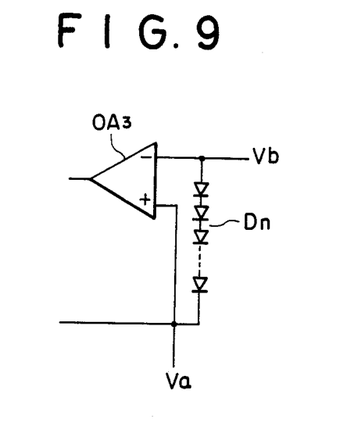
FIG. 9 is a partial circuit diagram showing a further embodiment of the present invention in which a series-connected diode train is used.

FIG. 9 shows a still further modification of the present invention in which the difference (Va1-Va2) is increased by using a series-connected diode train Dn in place of the single diode D1 in FIG. 6. It should also be noted that the output from the detecting circuit 9 may be directly used in some applications.

As is obvious from the above equation (7) and the circuit shown in FIG. 6, a distance measurement may be carried out simply by detecting fluctuating components of the signal currents produced by a light pulse impinging upon the detector 5.

Figure 10:
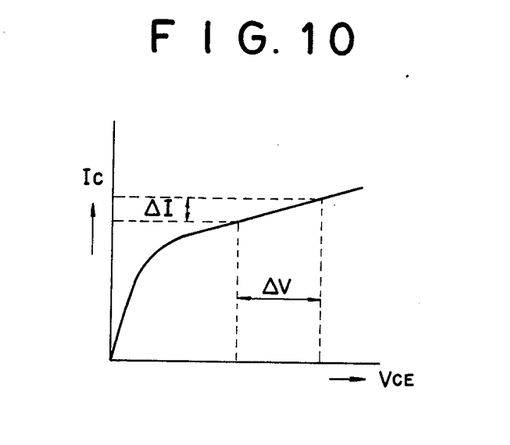
FIG. 10 is a graph showing the typical characteristics of the transistor Tr4 with the abscissa taken for collector-emitter voltage $V_{CE}$ and the ordinate taken for collector current $I_C$.

In an ideal state, the first detecting circuit shown in FIG. 6 will operate properly and no particular problem arises. However, in reality, since the collector-emitter voltage $V_{CE}$ vs collector current $I_C$ characteristic of the PNP transistor Tr4 is as shown in FIG. 10, collector current $I_C$ changes by the amount of $\Delta I$ when collector-emitter voltage $V_{CE}$ changes by the amount of $\Delta V$. Accordingly, with potential Vb=0 in a steady state, when collector voltage Vc of the PNP transistor Tr4 decreases to −2V at the time of radiation of a light pulse, collector-emitter voltage $V_{CE}$ changes by the amount of 2V, which, in turn, will bring about a significant fluctuation in collector current $I_C$. The larger the amount of background light, the more serious the above-described problem will be.

Figure 11:
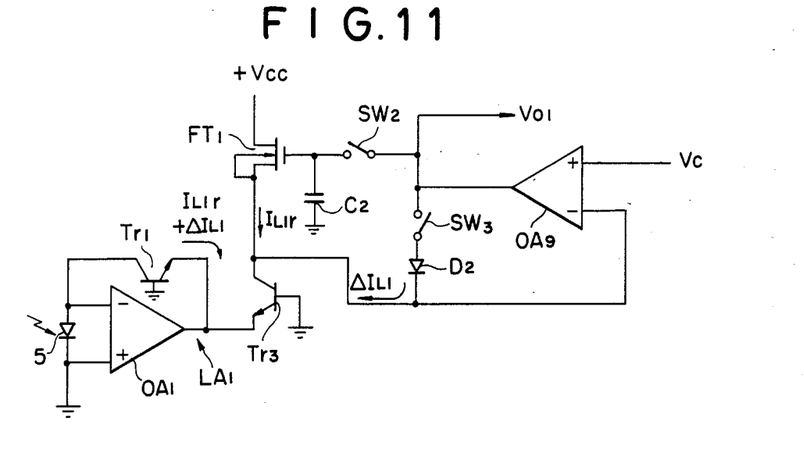
FIG. 11 is a circuit diagram showing a still further embodiment of the present invention.

FIG. 11 shows the structure of the first or second detecting circuit designed to obviate the above-described problem associated with the use of a PNP transistor in accordance with one embodiment of the present invention. As noted earlier, since the first and second detecting circuits 9a and 9b are of an identical structure, only the first detecting circuit 9a will be described here.

As shown in FIG. 11, first signal current $I_{L1}$ from the detector 5 is subjected to logarithmic conversion by having it passed through the logarithmic compression transistor Tr1, which, together with the operational amplifier OA1, forms the logarithmic conversion section LA1, thereby providing an output of $V_{L1} = -(kT/q) \cdot \ln(I_{L1}/I_S)$, as shown in equation (4). The current corresponding to signal current $I_{L1}$ passes through a MOSFET FT1 from a power supply $+V_{CC}$ and it is expanded by an expanding transistor Tr3. Under the condition, if the base potential of the transistor Tr3 is set approximately 60 mV higher than the base potential of the transistor Tr1, the current will be expanded by 10 times; on the other hand, if the emitter area of the transistor Tr3 is set twice as large as that of the transistor Tr1, a twice-expanded current will be obtained. The following description is the case where no expansion, or unit expansion, takes place.

In steady state condition, the switch SW2 is open and the switch SW3 is closed. Under the condition, since the feed back loop of the operational amplifier OA9 is completed, the source potential of the NMOSFET FT1 is clamped at the potential VC which is applied to the non-inverting input of the operational amplifier OA9.

Figure 12:
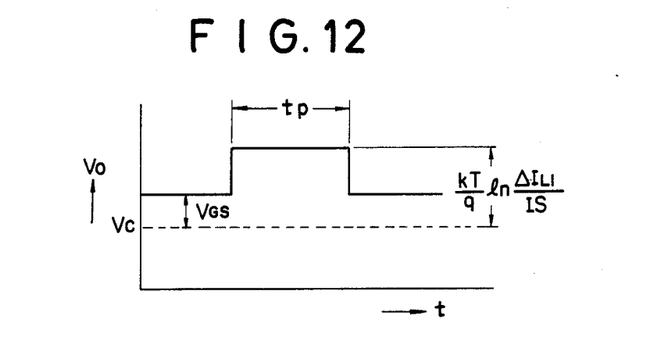
FIG. 12 is a waveform diagram which is useful in understanding the operation of the circuit of FIG. 11.

Then, simultaneously with the radiation of a light pulse, the switch SW2 is turned open and the switch SW3 is closed. Since the gate potential of NMOSFET FT1 is fixed by the charges accumulated in the capacitor C2 at the time of introduction of background light, background light current component $I_{L1r}$ is supplied to the transistor Tr3 by the NMOSFET FT1. On the other hand, the fluctuating current component $\Delta I_{L1}$ produced by a light pulse is supplied from the operational amplifier OA9 through the diode D2. In this instance, since the feed back loop including the diode D2 is established for the operational amplifier OA9, gate-to-source voltage $V_{GS}$ of the NMOSFET FT1 remains unchanged. FIG. 12 graphically represents how the output $V_O$ supplied from the operational amplifier OA9 varies in the above-described condition. In FIG. 12, tp indicates a period of light pulse radiation.

Described more in detail, in a steady state condition, the following relation holds.

$$V_{O1} = V_C + V_{GS}(I_D = I_{LS}) \qquad (8)$$

When a reflected light pulse is received, the following relation is obtained.

$$V_{O1} = V_C + \frac{kT}{q} \ln\left(\frac{\Delta I_{L1}}{I_S}\right) \quad (9)$$

where, $I_S$ is the reverse current of the diode D2.

It is to be noted that there is also provided the second detecting circuit 9b identical in structure to the above-described first detecting circuit 9a, and an output $V_{O2}$ similar to $V_{O1}$ is supplied therefrom.

Figure 13:
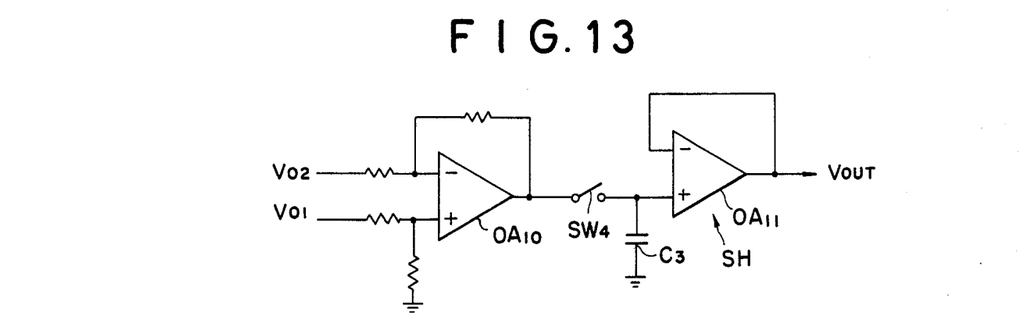
FIG. 13 is a circuit diagram for processing signals supplied from a pair of circuits shown in FIG. 11.

The outputs $V_{O1}$ and $V_{O2}$ thus obtained are supplied to the differential detecting circuit 11 as shown in FIG. 13. When these two voltages $V_{O1}$ and $V_{O2}$ are applied to the inputs of the operational amplifier OA10 formed as a differential amplifier, the following voltage signal $V_{DO}$ is supplied as its output.

$$V_{DO} = V_{O1} - V_{O2} \quad (10)$$

$$= V_C + \frac{kT}{q} \ln \frac{\Delta I_{L1}}{I_S} - \left(V_C + \frac{kT}{q} \ln \frac{\Delta I_{L2}}{I_S}\right)$$

$$= \frac{kT}{q} \ln\left(\frac{\Delta I_{L1}}{\Delta I_{L2}}\right)$$

In this manner, the current ratio corresponding to a distance to be measured is given in the form of voltage signal $V_{DO}$. As shown in FIG. 13, the voltage signal $V_{DO}$ may be sampled and held during the on condition of a light pulse by means of a sample and hold circuit SH comprised of a sampling switch SW4, a holding capacitor C3 and an operational amplifier OA11 forming a voltage follower as a buffer. However, in the case where a light emitting diode and the like is used as the light emitting element, since light emitting efficiency significantly decreases due to temperature increase at the junction, sampling had better be carried out immediately after the establishment of on-condition of a light pulse. Such a scheme of immediate sampling is also advantageous in the case where a cyclic or pulsating component of the power supply is included in the background light.

Since the sampled output is comprised of a voltage with its level proportional to a distance, it may be directly used as a distance signal to be applied to an automatic focussing mechanism or to a visual indicator. Alternatively, the sampled output may be further converted into one of a plurality of predetermined signals representing different distance zones with the use of a plurality of comparators and reference voltages.

As set forth above, in accordance with this embodiment of the present invention, the influence of background light may be eliminated effectively as well as stably thereby allowing to carry out a distance measurement with a high accuracy. Moreover, the first and second detecting circuits are comprised of such elements as MOSFET, bipolar transistor, operational amplifier, diode, etc., which are all suited in fabricating the circuits in the form of an I.C., and no elements such as junction-type FET's which are not suited for I.C. fabrication are used.

Several modifications of the above-described embodiment of the present invention will be described hereinbelow.

Figure 14:
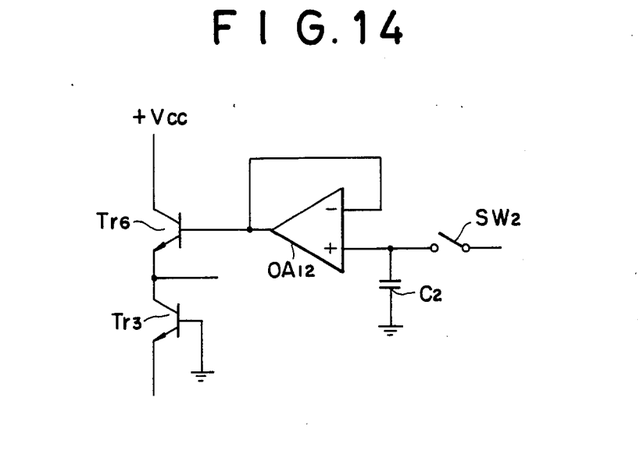
FIGS. 14 through 17 are circuit diagrams showing several modifications of the present invention.

FIG. 14 shows the case in which use is made of a combination including an operational amplifier OA12 formed as a voltage follower and an NPN transistor Tr6 instead of the NMOSFET FT1 in FIG. 11. With such a structure, it is only required to apply a bipolar process when fabricating in the form of an I.C. and thus its I.C. formation can be greatly simplified.

Figure 15:
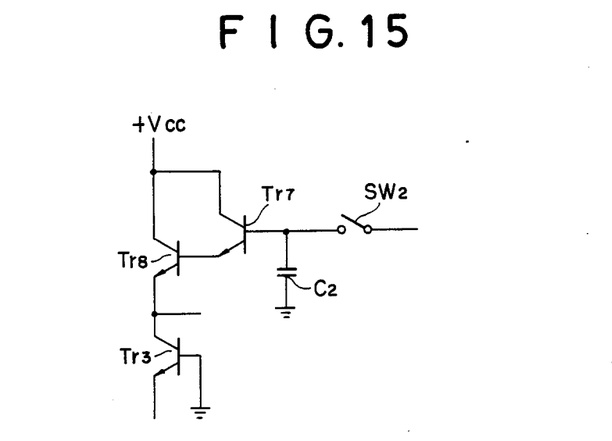

FIG. 15 shows a further modification in which use is made of a Darlington pair comprised of NPN transistors Tr7 and Tr8 in place of the NMOSFET FT1 in the circuit of FIG. 11. This structure has the same advantages as those of the circuit shown in FIG. 14.

Figure 16:
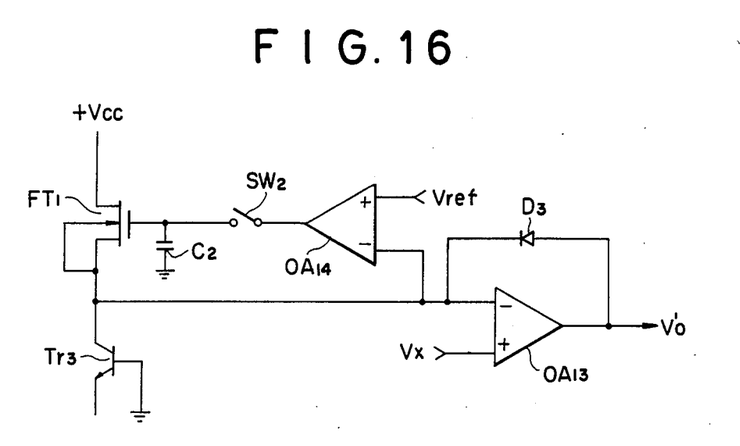

FIG. 16 shows a still further modification in which use is made of a pair of interconnected operational amplifiers OA13 and OA14 in place of the operational amplifier OA9 in the circuit of FIG. 11. In operation of the circuit shown in FIG. 16, in a steady state condition, the switch SW2 is kept closed, and input voltage $V_x$ to the non-inverting input of the operational amplifier OA13 is set lower in level than input voltage $V_{ref}$ to the non-inverting input of the operational amplifier OA14, thereby maintaining output voltage $V_O'$ to be "L", or low level. With such a structure, no current passes through the logarithmic compression diode D3, and current flows to the transistor Tr3 through the NMOSFET FT1. Then, upon radiation of a light pulse, the switch SW2 is turned open and voltage $V_x$ is made equal to voltage $V_{ref}$. By doing so, the signal current produced by a reflected light pulse now flows through the diode D3 and the following output $V_O'$ is obtained.

$$V_O' = V_{ref} + \frac{kT}{q} \ln \frac{\Delta I_{L1}}{I_S} \quad (11)$$

where $I_S$ is the reverse current of the diode D3.

In the structure shown in FIG. 16, if a light pulse has an extremely small pulse width, the switch SW2 may be substituted by a high-valued resistor since it may be omitted by making the time constant of the system larger.

In the circuit shown in FIG. 11, an offset voltage of the operational amplifier OA9 will appear in its output if the diode D2 is directly used. That is, denoting the offset amount with $V_{of}$ and the voltage drop of the diode D2 with $V_D$, the following equation may be obtained.

$$V_O = V_C + V_{of} + V_D \quad (12)$$

Under the circumstances, if a difference in offset voltage is present between the first and second detecting circuits connected to the position sensitive detector 5, error in output after the differential processing as described above will be amplified.

Figure 17:
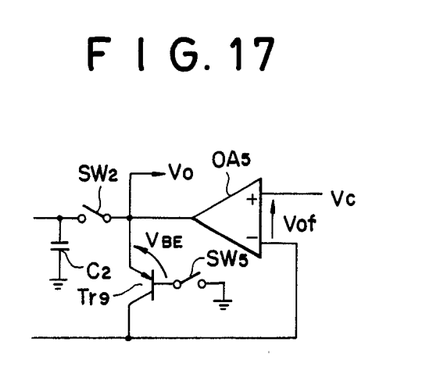

In view of the above, FIG. 17 shows another modification of the present invention in which PNP transistor Tr9 is provided in place of the diode D2 in the circuit of FIG. 11. With such a structure, the following equation may be obtained for output $V_O$.

$$V_O = V_{BE} = \frac{kT}{q} \ln \frac{\Delta I_{L1}}{I_S} \quad (13)$$

where $V_{BE}$ is the base-emitter voltage of the transistor Tr9. In this case, it is so structured that the switch SW5 is closed only during light pulse radiation. This is because, if the base of the transistor Tr9 is always connected to ground, current will flow between the collector and base of the transistor Tr9 in a steady state condition, which will increase the level of power consumption.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A distance measuring apparatus for measuring a distance from a reference point to a subject of interest comprising:

means for radiating an energy beam toward said subject of interest;

receiving means for receiving the portion of said energy beam reflected from said subject, said receiving means including a receiving surface defined between two extreme points and means for supplying first and second current signals with the magnitude of each of said first and second current signals being respectively determined by the location of impingement of said reflected energy beam within and in respect to said two extreme points;

first extracting means for extracting and outputting a first fluctuating component from said first current signal in the form of a voltage said first extracting means including a first logarithmic conversion circuit for receiving said first current signal, first storing means for storing a background light component prior to radiation by said energy beam and first sampling means for sampling said first fluctuating component as a difference between sid background light component stored in said first storing means and said first current signal;

second extracting means for extracting and outputting a second fluctuating component from said second current signal in the form of a voltage said second extracting means including a second logarithmic conversion circuit for receiving said second current signal, second storing means for storing said background light component prior to radiation by said energy beam and second sampling means for sampling said second fluctuating component as a difference between said background light component stored in said second storing means and said second current signal; and a differential processing means for producing a distance signal indicating a distance to said subject by taking a difference between said first and second fluctuating components which are output from said first and second extracting means.

2. The apparatus of claim 1 wherein said energy beam is a light pulse.

3. The apparatus of claim 1 wherein said means for radiating includes a projection lens, the location of which corresponds to said reference point.

4. The apparatus of claim 3 wherein said receiving means includes a receiving lens and the distance between said projection lens and said receiving lens defines a base length.

5. The apparatus of claim 4 wherein said receiving means further includes a position sensitive detector having a surface defining said receiving surface.

6. The apparatus of claim 5 wherein said position sensitive detector is a planar-type PIN photodiode.

7. The apparatus of claim 1 wherein one of said two extreme points corresponds to said subject at infinity and the other corresponds to said subject at the closest distance.

8. The apparatus of claim 1 wherein each of said first and second storing means includes a capacitor.

9. The apparatus of claim 8 wherein each of said first and second sampling means includes a switch which is set closed when said background light component is stored into the corresponding capacitor and which is set open when said first and second fluctuating components are to be extracted.

* * * * *